United States Patent
Gamache et al.

(10) Patent No.: US 7,686,079 B2
(45) Date of Patent: Mar. 30, 2010

(54) METHOD FOR REMOVING SILICA FROM EVAPORATOR CONCENTRATE

(75) Inventors: David E. Gamache, Oswego, IL (US); Charles Edward Mackey, Joliet, IL (US); Mark D. Patterson, Aurora, IL (US)

(73) Assignee: HPD, LLC, Plainfield, IL (US)

( * ) Notice: Subject to any disclaimer, the term of this patent is extended or adjusted under 35 U.S.C. 154(b) by 13 days.

(21) Appl. No.: 12/193,432

(22) Filed: Aug. 18, 2008

(65) Prior Publication Data

US 2010/0038081 A1 Feb. 18, 2010

(51) Int. Cl.
*E21B 43/40* (2006.01)
*E21B 43/24* (2006.01)

(52) U.S. Cl. .............. 166/267; 166/266; 166/272.3; 166/371

(58) Field of Classification Search ............. None
See application file for complete search history.

(56) References Cited

U.S. PATENT DOCUMENTS

| | | | |
|---|---|---|---|
| 4,765,913 A | 8/1988 | Featherstone | |
| 6,733,636 B1 | 5/2004 | Heins | |
| 6,761,865 B1 | 7/2004 | Gallup et al. | |
| 7,077,201 B2 | 7/2006 | Heins | |
| 7,150,320 B2 | 12/2006 | Heins | |
| 2008/0110630 A1* | 5/2008 | Minnich et al. | 166/303 |

* cited by examiner

*Primary Examiner*—Zakiya W. Bates
(74) *Attorney, Agent, or Firm*—Coats & Bennett, P.L.L.C.

(57) ABSTRACT

A method for removing silica from evaporator concentrate to facilitate disposal of the concentrate. An alkaline earth compound is mixed with the concentrate in a crystallizer. Silica in the concentrate reacts with the alkaline earth compound and precipitates from the concentrate as alkaline silicate complexes. The concentrate having the alkaline earth silicate complexes is directed to a separator where the alkaline earth silicate complexes are separated from the concentrate, producing an aqueous solution and slurry. The slurry is directed to a filter where solids are separated from a filtrate. Both the aqueous solution and the filtrate can be disposed of by deep well injection.

30 Claims, 1 Drawing Sheet

METHOD FOR REMOVING SILICA FROM EVAPORATOR CONCENTRATE

FIELD OF INVENTION

The present invention relates to methods for removing silica from evaporator concentrate.

BACKGROUND

Steam assisted gravity discharge (SAGD) processes are often used to recover heavy oil when the oil is bound or contained in sand deposits. In the SAGD process, steam is injected into an oil bearing formation to heat and reduce the viscosity of the oil. After the steam fully condenses, the condensed steam mixes with the oil and flows to a collection well. The oil-water mixture is pumped to a separator where the oil is separated from the water. After initial separation from the oil, the water is further de-oiled in a polishing deoiler which removes additional oil and other solids. The resulting de-oiled water is referred to as produced water.

Typically, the produced water is directed to an evaporator for purification. The evaporator produces a clean distillate and an evaporator concentrate, which usually includes a high silica concentration. To prevent silica scaling in the evaporator, the pH of the produced water is generally increased with the addition of sodium hydroxide or another base, to maintain silica solubility. The distillate is sent to a steam generator and the resulting steam is injected into the oil formation to recover additional oil. The evaporator concentrate may be disposed of by deep well injection. However, before disposal, the evaporator concentrate must be treated to reduce the silica concentration to prevent plugging of the well formation.

One method that has been developed to reduce silica in evaporator concentrate is further concentration of the evaporator concentrate in a forced circulation crystallizer. Another method involves neutralizing the pH of the evaporator concentrate and precipitating the silica. After precipitation, the silica is removed by settling or filtration. However, both methods have proved problematic and consequently, the evaporator concentrate is often disposed of in salt caverns. Therefore, there is a need for a cost effective and efficient method to remove silica from the evaporator concentrate so that the evaporator concentrate may be disposed of by deep well injection without plugging the oil formation.

SUMMARY

The present invention details a method of removing silica from evaporator concentrate in order to facilitate disposal of the evaporator concentrate.

In one embodiment the evaporator concentrate is directed to a crystallizer and an alkaline earth compound is mixed with the concentrate prior to the concentrate reaching the crystallizer or mixed with the concentrate in the crystallizer. This causes silica to precipitate from the concentrate and form alkaline earth silicate complexes where the alkaline earth silicate complexes form crystals in the evaporator concentrate. The evaporator concentrate having the alkaline earth silicate complexes is directed to a separator where the alkaline earth silicate complexes are separated from the concentrate, producing an aqueous solution. The aqueous solution can then be directed into an injection well or otherwise disposed of.

In another embodiment the present invention entails a method for recovering oil and removing silica from produced water. The method includes recovering an oil-water mixture from an oil well and separating oil from the oil-water mixture to produce an oil product and produced water having silica. The produced water is directed to an evaporator to produce a distillate and evaporator concentrate having silica. The distillate is directed to a steam generator, where steam is produced and directed into the oil well. The method further includes directing the evaporator concentrate to a first crystallizer and mixing an alkaline earth reagent with the evaporator concentrate to precipitate silica in the form of one or more alkaline earth silicate complexes. After mixing the alkaline earth reagent with the evaporator concentrate, the evaporator concentrate is directed to a separator where the one or more alkaline earth silicate complexes are separated from the evaporator concentrate producing a clarified aqueous solution and a slurry. The slurry is directed to a filter, where solids are separated from a filtrate. The clarified aqueous solution can be disposed of by deep well injection.

DETAILED DESCRIPTION

Figure 1:
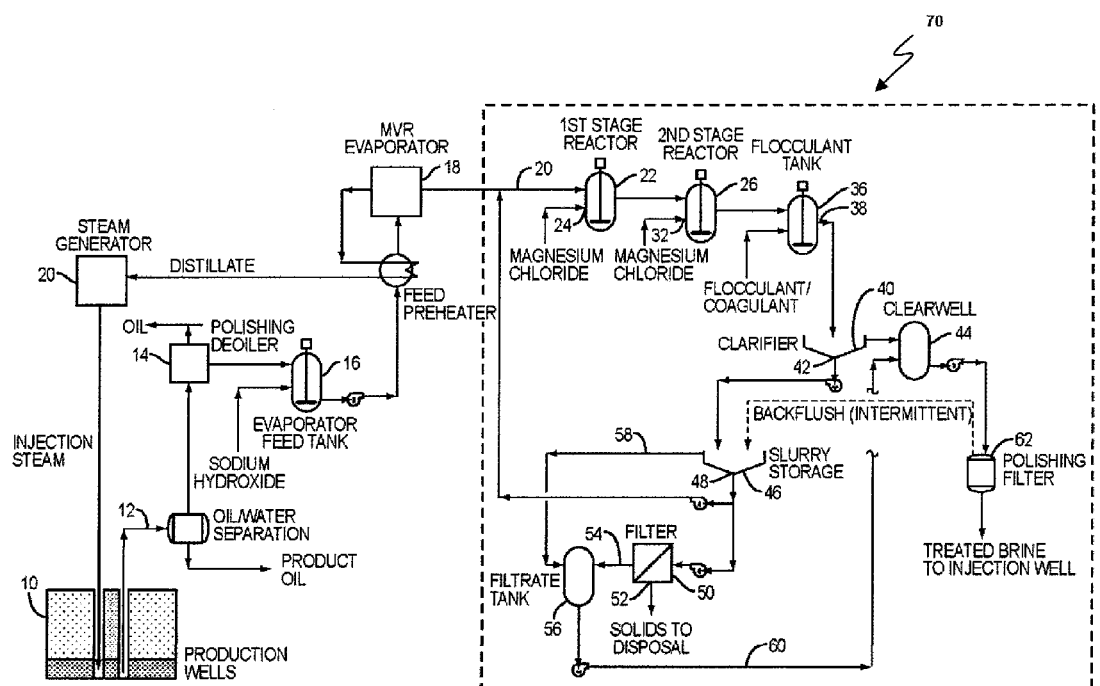
FIG. 1 is a schematic illustration depicting a system and process for removing silica from produced water.

FIG. 1 illustrates a system and method for recovering oil, such as a SAGD (Steam Assisted Gravity Discharge) process, that utilizes one or more evaporators to treat the produced water. Distillate recovered from the evaporator is directed to a steam generator and the resulting steam is injected into an oil formation. During evaporation, the produced water concentrates into an evaporator concentrate having high silica content. The system and process disclosed herein includes a treatment system for removing substantial quantities of silica from the evaporator concentrate so that the evaporator concentrate may be disposed of by deep well injection.

Typically, evaporatively concentrated produced water from a SAGD process has a silica concentration between 500 ppm and 9,000 ppm. A caustic such as sodium hydroxide may be added to the produced water or the resulting evaporator concentrate to raise the pH of the produced water or evaporate concentrates so as to maintain a substantial portion of the silica in solution. While the pH of the produced water or evaporator concentrate can vary, the pH of the resulting evaporator concentrate may range from approximately 10 to approximately 13 and may, in many cases, range from approximately 10.5 to approximately 12.5. To dispose of the evaporator concentrate resulting from the produced water by deep well injection without plugging the oil formation, the injected evaporator concentrate must have a silica concentration of less than 150 ppm. The process described herein typically reduces the silica concentration to levels ranging between 90 ppm and 130 ppm.

A SAGD process including an evaporator concentrate treatment system is illustrated in FIG. 1. Although the evaporator concentrate treatment system and process is discussed in the content of a SAGD process, it should be pointed out that the evaporator concentrate treatment system and process can be implemented in other oil recovery processes and can be used in many applications other than oil recovery. The following description describes how the evaporator concentrate treatment system and process is incorporated and used in a SAGD process.

In implementing the SAGD process, high quality steam is injected into an injection well that extends through or adjacent to an oil bearing formation 10. Heat associated with the steam mobilizes the oil. The steam condenses and mixes with the oil to form an oil-water mixture. The oil-water mixture is directed to an oil-water separator 12 where the oil product is separated from the water. The water is then de-oiled in a polishing deoiler 14 to remove additional oil and solids.

After undergoing the above separation process, the resulting water is referred to as produced water. A portion of the produced water may be reused in the SAGD process for steam injection. To produce high quality steam, the produced water is directed to evaporator 18. Various types of evaporators can be used to treat the produced water. Falling film-type evaporators having mechanical vapor recompression are one type of evaporator suitable for treating produced water.

The produced water directed to the evaporator often includes a high silica concentration that can cause scaling in the evaporator. To maintain silica solubility and prevent scaling, the pH of the produced water may be increased by the addition of sodium hydroxide or another base. The base may be added to the produced water in evaporator 18 or in feed tank 16 positioned upstream of the evaporator. With silica dissolved in the produced water, clean distillate may be recovered in the evaporator. The distillate is condensed and directed to a steam generator 20 that produces steam to be injected into an oil formation 10. Steam generator 20 may include a once through steam generator, package boiler or any other conventional steam generation system. As the clean distillate evaporates from the produced water, evaporator concentrate with a high silica concentration forms in the evaporator. Before the evaporator concentrate is disposed of by deep well injection, it is desirable to reduce the silica concentration of the evaporator concentrate to prevent plugging of the oil formation.

An evaporator concentrate treatment system 70 that effectively reduces the silica concentration in the evaporator concentrate is illustrated in FIG. 1. Evaporator concentrate is directed from evaporator 18 to a first crystallizer 22 through line 20. Prior to the evaporator concentrate reaching the crystallizer 22 or while the evaporator concentrate is in the crystallizer 22, an alkaline earth reagent is mixed with the evaporator concentrate. The alkaline earth reagent is typically an alkaline earth compound such as $MgCl_2$, MgO, $CaCl_2$, etc. The alkaline earth compound is mixed with the evaporator concentrate to promote silica precipitation and crystallization. In one embodiment, magnesium chloride is added to the evaporator concentrate to promote silica precipitation in the form of one or more magnesium silicate complexes. The one or more magnesium silicate complexes may also react and crystallize with the base present in the evaporator concentrate. The amount of magnesium added to the crystallizer can vary, but is typically a function of the amount of silica present in the evaporator concentrate. Generally it is believed that an effective weight ratio of magnesium to silicon dioxide ($SiO_2$) is approximately 0.2 to approximately 0.4.

The treated evaporator concentrate is directed from first crystallizer 22 to a second crystallizer 26 through line 30. In the second crystallizer 26, an additional alkaline earth compound is added to the treated evaporator concentrate through inlet 32. As shown in FIG. 1, magnesium chloride is added to the treated evaporator concentrate to precipitate additional silica in the form of one or more magnesium silicate complexes. Again, the one or more magnesium silicate complexes may react and crystallize with the base present in the evaporator concentrate. As magnesium is added to the evaporator concentrate, the size of crystals in the evaporator concentrate increases. Thus, the crystals initially formed act as seed crystals and promote additional crystallization resulting in larger crystal growth. Although the above process describes a two-stage precipitation-crystallization process, in some applications, the dissolved silica may be precipitated and crystallized in only one crystallizer.

To enhance settling and separation, the treated evaporator concentrate with crystals may flow through treatment line 34 into flocculation tank 36. A flocculant and coagulant are added and mixed with the treated evaporator concentrate in flocculation tank 36. One example of a flocculant is a polymeric flocculant. An example of a coagulant is ferric chloride and/or aluminum sulfate. In some embodiments, flocculation may not be necessary. However, in some cases, mixing a flocculant and coagulant with the treated evaporator concentrate is advantageous because the flocculant and coagulant cause the magnesium silicate complexes to aggregate around the flocculant and form floc. This enhances settling and separation of the magnesium silicate complexes from the aqueous solution forming a part of the treated evaporator concentrate. The residency time for evaporator concentrate treatment in the flocculation tank 36 can vary. Typically, the evaporator concentrate, flocculent and coagulant are continuously mixed with a mixer disposed with the flocculation tank 36.

The treated evaporator concentrate, including the floc, flows from flocculation tank 36 through outlet 38 into a solids separator such as a clarifier 40. If the evaporator concentrate is not treated in flocculation tank 36, the evaporator concentrate flows directly from the crystallizer to the separator 40. In some embodiments, ballasted flocculation systems may be used in lieu of a conventional clarifier. A ballasted flocculation system utilizes microsand or other ballast to form floc. For a detailed understanding of ballasted flocculation processes, reference is made to U.S. Pat. Nos. 4,927,543 and 5,730,864, the disclosures of which are expressly incorporated herein by reference. In either a ballasted flocculation process or in a conventional clarifier, the solids settle by gravity and form a concentrated slurry having the magnesium silicate crystal complexes. Clarified water, sometimes referred to as an aqueous solution, is separated from the slurry and overflows by gravity from clarifier 40 into clear well 44. The concentrated slurry is discharged through outlet 42 from clarifier 40 into a slurry storage tank 46, which in some embodiments may act as a second clarifier. The slurry further concentrates by gravity settling in the slurry storage tank 46 and the concentrated slurry flows from the slurry storage tank through outlet 48 to filter 50.

In some applications, a portion of the concentrated slurry is recirculated from the slurry storage tank 46 to first crystallizer 22. The slurry added to the evaporator concentrate in first crystallizer 22 serves as seed material, which augments crystal size. Slurry not recirculated to first crystallizer 22 is directed to filter 50. Filter 50 may be a press filter or other type of filter that dewaters the solids and produces an aqueous filtrate. In one embodiment, the dewatered solids form a solid wetcake and are sent to disposal through outlet 52, while the filtrate flows through line 54 into filtrate tank 56.

As mentioned above, the slurry storage tank 46 may act as a second clarifier. In these applications, as the slurry concentrates and settles in the slurry storage tank 46, clarified water flows from the slurry storage tank through line 58 into filtrate tank 56. The clarified water decanted from the slurry storage tank 46 mixes with the filtrate in filtrate tank 56 to form an aqueous stream. The aqueous stream flows through line 60 into clear well 44 where it mixes with the clarified water already present in the clear well. To remove residual suspended solids and to protect against upsets in clarifier 40, the resulting aqueous stream or solution leaving the clear well 44 is filtered in polishing filter 62. The resulting effluent is suitable for deep well injection.

While the process of removing silica from evaporator concentrate has been described in the context of an oil recovery process that generates produced water, it is appreciated that the process can be applied in other applications. For example, evaporator concentrate or evaporator concentrate having high silica concentration can be collected at one site and transferred to a treatment site. One or more crystallizers at the treatment site remove silica from the evaporator concentrate or evaporator concentrate producing a clarified aqueous stream that can be disposed of in various ways, including deep well injection.

The present invention may of course be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced herein.

The invention claimed is:

1. A method for recovering oil and removing silica from produced water, the method comprising:
   a. recovering an oil-water mixture from an oil well;
   b. separating oil from the oil-water mixture to produce an oil product and produced water having silica;
   c. directing the produced water to an evaporator and producing a distillate and an evaporator concentrate having silica;
   d. directing the distillate to a steam generator, producing steam from the distillate, and directing the produced steam into the oil well;
   e. directing the evaporator concentrate to a first crystallizer;
   f. mixing an alkaline earth reagent with the evaporator concentrate and precipitating silica from the evaporator concentrate to form one or more alkaline earth silicate complexes, wherein the one or more alkaline earth silicate complexes form crystals in the evaporator concentrate;
   g. directing the evaporator concentrate having the one or more alkaline earth silicate complexes to a separator;
   h. separating the one or more alkaline earth silicate complexes from the evaporator concentrate and producing an aqueous solution and a slurry containing the one or more alkaline earth silicate complexes;
   i. directing at least a first portion of the slurry to a filter, filtering at least the first portion of the slurry to separate solids from the first portion of the slurry, and producing a filtrate; and
   j. disposing of the aqueous solution.

2. The method of claim 1 further including disposing of aqueous solution by directing the aqueous solution into a deep well.

3. The method of claim 2 further comprising disposing of at least a portion of the filtrate by directing the filtrate into the deep well.

4. The method of claim 1 further comprising mixing at least a second portion of the slurry with the evaporator concentrate and treating the mixture of evaporator concentrate and slurry in the first crystallizer.

5. The method of claim 1 further comprising directing the evaporator concentrate from the first crystallizer to a second crystallizer and treating the evaporator concentrate in a second crystallizer.

6. The method of claim 5 further comprising treating the evaporator concentrate in the first and second crystallizers with magnesium chloride and precipitating silica from the evaporator concentrate to form one or more magnesium silicate complexes.

7. The method of claim 1 wherein the alkaline earth reagent includes magnesium chloride and the method further comprises mixing the magnesium chloride with the evaporator concentrate in the first crystallizer and precipitating silica from the evaporator concentrate to form one or more magnesium silicate complexes.

8. The method of claim 1 wherein the alkaline earth reagent is an alkaline earth compound.

9. The method of claim 8 wherein the alkaline earth compound is selected from the group consisting of magnesium chloride, magnesium oxide, and calcium chloride.

10. The method of claim 1 further including:
    mixing a coagulant and a flocculent with the evaporator concentrate; and
    wherein the separator includes a clarifier, and after mixing the alkaline earth reagent, coagulant and flocculent with the evaporator concentrate, the method includes directing the evaporator concentrate to the clarifier and clarifying the evaporator concentrate to produce the aqueous solution and the slurry; and
    wherein the alkaline earth reagent includes an alkaline earth compound selected from the group consisting of magnesium chloride, magnesium oxide and calcium chloride.

11. The method of claim 10 including disposing of at least a portion of the filtrate by directing the filtrate into a deep well; and mixing at least a second portion of the slurry with the evaporator concentrate and treating the mixture of the evaporator concentrate and slurry in the first crystallizer.

12. The method of claim 1 including filtering the aqueous solution prior to disposal.

13. The method of claim 1 wherein the slurry is produced in a first separator and the method further includes:
    directing the slurry to a second separator, further concentrating the slurry in the second separator, and producing a clarified aqueous stream; and
    directing the further concentrated slurry to the filter.

14. The method of claim 1 including separating the one or more alkaline earth silicate complexes from the evaporator concentrate in a ballasted flocculation system where the evaporator concentrate is mixed with a coagulant, flocculent and a ballast.

15. The method of claim 1 wherein the produced water has a silica concentration greater than 500 mg/l and the method includes removing the silica from the evaporator concentrate such that the concentration of silica in the aqueous solution is less than 150 mg/l.

16. The method of claim 1 wherein the pH of the evaporator concentrate is in the range of approximately 10 to approximately 13.

17. A method of treating evaporator concentrate resulting from the treatment of produced water from an oil recovery process, comprising:
    a. directing evaporator concentrate having silica produced by evaporating produced water from the oil recovery process to a crystallizer;
    b. mixing an alkaline earth compound with the evaporator concentrate, precipitating silica from the concentrate and forming one or more alkaline earth silicate complexes, wherein the one or more alkaline earth silicate complexes form crystals in the concentrate;
    c. directing the evaporator concentrate having one or more alkaline earth silicate complexes to a separator; and
    d. separating the one or more alkaline earth silicate complexes from the evaporator concentrate and producing an aqueous solution and a slurry containing the one or more alkaline earth silicate complexes.

18. The method of claim 17 including directing the slurry to a filter and filtering the slurry to separate solids from the slurry and producing a filtrate.

19. The method of claim 18 including disposing of both the aqueous solution and the filtrate in a deep well.

20. The method of claim 17 including disposing of the aqueous solution.

21. The method of claim 20 including directing the aqueous solution into a deep well.

22. The method of claim 21 including disposing of at least a portion of a filtrate by directing the filtrate into the deep well.

23. The method of claim 17 including directing the alkaline earth compound into the crystallizer and mixing the alkaline earth compound with the evaporator concentrate the crystallizer.

24. The method of claim 17 wherein the evaporator concentrate is treated in two crystallizers disposed in series.

25. The method of claim 17 including mixing a coagulant and a flocculent with the evaporator concentrate downstream from the crystallizer and prior to separating the one or more alkaline earth silicate complexes from the evaporator concentrate.

26. The method of claim 25 including directing the evaporator concentrate having the coagulant and flocculent mixed therewith to a clarifier which produces the aqueous solution and the slurry.

27. The method of claim 17 wherein the alkaline earth compound includes magnesium chloride and the method includes mixing the magnesium chloride with the evaporator concentrate.

28. The method of claim 17 wherein the alkaline earth compound is selected from the group consisting of magnesium chloride, magnesium oxide, and calcium chloride.

29. The method of claim 17 wherein the pH of the evaporator concentrate is in the range of approximately 10 to approximately 13.

30. The method of claim 17 including directing the slurry to a filter and filtering the slurry to separate solids from the slurry and produce a filtrate;

directing the aqueous solution into a deep well; disposing of at least a portion of the filtrate by directing the filtrate into the deep well;

mixing a coagulant and a flocculent with the evaporator concentrate downstream from the crystallizer and prior to separating the one or more alkaline earth silicate complexes from the evaporator concentrate; and directing the evaporator concentrate having the coagulant and flocculent mix therewith to a clarifier which produces the aqueous solution and the slurry.

\* \* \* \* \*